(12) United States Patent
Oliver et al.

(10) Patent No.: US 9,454,672 B2
(45) Date of Patent: *Sep. 27, 2016

(54) MESSAGE DISTRIBUTION CONTROL

(71) Applicant: Dell Software Inc.

(72) Inventors: Jonathan J. Oliver, San Carlos, CA (US); Gleb Budman, Palo Alto, CA (US); Andrew F. Oliver, Glenhuntly (AU); Eugene Koontz, Mountain View, CA (US); Christine Drake, San Mateo, CA (US)

(73) Assignee: DELL SOFTWARE INC., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/491,829

(22) Filed: Sep. 19, 2014

(65) Prior Publication Data

US 2015/0047055 A1 Feb. 12, 2015

Related U.S. Application Data

(63) Continuation of application No. 11/036,603, filed on Jan. 14, 2005, now Pat. No. 8,886,727.

(60) Provisional application No. 60/642,266, filed on Jan. 5, 2005, provisional application No. 60/578,135, filed on Jun. 8, 2004, provisional application No. 60/543,300, filed on Feb. 9, 2004, provisional application No. 60/539,615, filed on Jan. 27, 2004.

(51) Int. Cl.
*G06F 7/04* (2006.01)
*G06F 21/62* (2013.01)
(Continued)

(52) U.S. Cl.
CPC ..... *G06F 21/6218* (2013.01); *G06F 17/30657* (2013.01); *G06F 21/6227* (2013.01); *H04L 12/5855* (2013.01); *H04L 51/12* (2013.01); *H04L 51/14* (2013.01); *H04L 12/585* (2013.01)

(58) Field of Classification Search
USPC ......................................................... 709/206
See application file for complete search history.

(56) References Cited

U.S. PATENT DOCUMENTS 6,105,022 A 8/2000 Takahashi et al.
6,112,227 A 8/2000 Heiner
(Continued)

FOREIGN PATENT DOCUMENTS

JP 2000-353133 12/2000
JP 2003/099371 4/2003
(Continued)

OTHER PUBLICATIONS

U.S. Appl. No. 11/927,458 Final Office Action mailed May 8, 2015.
(Continued)

*Primary Examiner* — Joseph Greene
(74) *Attorney, Agent, or Firm* — Polsinelli LLP

(57) ABSTRACT

A method of controlling distribution of content in a message sent by a message sender comprises receiving an indication from the message sender that the message is to be protected, identifying content in the message to be protected, adding the identified content to a database of protected content, and determining whether subsequently received content in a subsequently received message is associated with the identified content. A system for controlling distribution of content in a message sent by a message sender comprises a processor configured to receive an indication from the message sender that the message is to be protected, identify content in the message to be protected, add the identified content to a database of protected content, and determine whether subsequently received content in a subsequently received message is associated with the identified content.

20 Claims, 7 Drawing Sheets

(51) Int. Cl.
*G06F 17/30* (2006.01)
*G06F 15/173* (2006.01)
*H04L 12/58* (2006.01)

(56) References Cited

U.S. PATENT DOCUMENTS

| | | | |
|---|---|---|---|
| 6,122,372 | A | 9/2000 | Hughes |
| 6,161,130 | A | 12/2000 | Horvitz et al. |
| 6,199,102 | B1 | 3/2001 | Cobb |
| 6,330,590 | B1 | 12/2001 | Cotton |
| 6,487,586 | B2 | 11/2002 | Ogilvie et al. |
| 6,578,025 | B1 | 6/2003 | Pollack et al. |
| 6,650,890 | B1 | 11/2003 | Irlam et al. |
| 6,711,615 | B2 | 3/2004 | Porras et al. |
| 6,732,157 | B1 | 5/2004 | Gordon et al. |
| 6,751,624 | B2 | 6/2004 | Christal et al. |
| 6,772,141 | B1 | 8/2004 | Pratt et al. |
| 6,772,196 | B1 | 8/2004 | Kirsch et al. |
| 6,941,348 | B2 | 9/2005 | Petry et al. |
| 6,941,467 | B2 | 9/2005 | Judge et al. |
| 7,089,241 | B1 | 8/2006 | Alspector et al. |
| 7,171,450 | B2 | 1/2007 | Wallace et al. |
| 7,373,664 | B2 | 5/2008 | Kissel |
| 7,673,342 | B2 | 3/2010 | Hursey et al. |
| 8,713,110 | B2 | 4/2014 | Oliver |
| 8,886,727 | B1 * | 11/2014 | Oliver ............... G06F 21/6227 709/206 |
| 2002/0007453 | A1 | 1/2002 | Nemovicher |
| 2002/0035561 | A1 | 3/2002 | Archer et al. |
| 2002/0059384 | A1 | 5/2002 | Kaars |
| 2002/0065895 | A1 | 5/2002 | Zhang et al. |
| 2002/0091690 | A1 | 7/2002 | Bailey et al. |
| 2002/0165861 | A1 | 11/2002 | Gilmour |
| 2002/0194487 | A1 | 12/2002 | Grupe |
| 2003/0018638 | A1 | 1/2003 | Abe et al. |
| 2003/0088627 | A1 | 5/2003 | Rothwell et al. |
| 2003/0126561 | A1 | 7/2003 | Woehler et al. |
| 2003/0172301 | A1 | 9/2003 | Judge et al. |
| 2003/0185149 | A1 | 10/2003 | Daniell et al. |
| 2003/0204569 | A1 | 10/2003 | Andrews et al. |
| 2003/0233418 | A1 | 12/2003 | Goldman |
| 2004/0024639 | A1 | 2/2004 | Goldman |
| 2004/0024823 | A1 | 2/2004 | Del Monte |
| 2004/0103305 | A1 | 5/2004 | Ginter et al. |
| 2004/0133793 | A1 | 7/2004 | Ginter et al. |
| 2004/0139160 | A1 | 7/2004 | Wallace et al. |
| 2004/0139165 | A1 | 7/2004 | McMillan et al. |
| 2004/0158554 | A1 | 8/2004 | Trottman |
| 2004/0205463 | A1 | 10/2004 | Darbie |
| 2005/0021635 | A1 | 1/2005 | Graham et al. |
| 2005/0038750 | A1 | 2/2005 | Cahill et al. |
| 2005/0055410 | A1 | 3/2005 | Landsman et al. |
| 2005/0080860 | A1 | 4/2005 | Daniell et al. |
| 2005/0091321 | A1 | 4/2005 | Daniell et al. |
| 2005/0097174 | A1 | 5/2005 | Daniell |
| 2005/0108340 | A1 | 5/2005 | Gleeson et al. |
| 2005/0120019 | A1 | 6/2005 | Rigoutsos et al. |
| 2005/0125667 | A1 | 6/2005 | Sullivan et al. |
| 2005/0204005 | A1 | 9/2005 | Purcell et al. |
| 2008/0104062 | A1 | 5/2008 | Oliver |
| 2008/0104712 | A1 | 5/2008 | Oliver |

FOREIGN PATENT DOCUMENTS

| | | |
|---|---|---|
| JP | 2003/337751 | 11/2003 |
| JP | 2005/018745 | 1/2005 |
| WO | WO 2004/105332 | 12/2004 |
| WO | WO 2004/114614 | 12/2004 |

OTHER PUBLICATIONS

"Field Guide to Spam." Sophos. Last Updated: Feb. 3, 2004. http://www.sophos.com/spaminfo/explained/fieldguide.html.

"Majordomo FAQ," Oct. 20, 2001.

"There are 600,426,974,379,824,381,952 ways to spell Viagra," Apr. 7, 2004, http://cockeyed.com/lessons/viagra/viagra.html.

2003 CSI/FBI Computer Crime and Security Survey, Computer Security Institute and Federal Bureau of Investigation, http://i.cmpnet.com/gocsi/db_are/pdfs/fbi/FBI2003.pdf.

Allison, Lloyd "Dynamic Programming Algorithm for Sequence Alignment," Oct. 1996, http://www.csse.monash.edu.au/~lloyd/tildeStrings/Notes/DPA.html.

Allison, Lloyd et al., "When is a String like a String?" AI & Maths 1990, http://www.csse.monash.edu.au/~lloyd/tildeStrings/Alignment/90.AIM.html.

Balvanz, Jeff et al., "Spam Software Evaluation, Training, and Support: Fighting Back to Reclaim the Email Inbox," in the Proc. of the 32nd Annual ACM SIGUCCS Conference on User Services, Baltimore, MD, pp. 385-387, 2004.

Bellegarda, Jerome R. et al., "Automatic Junk E-Mail Filtering Based on Latent Content," IEEE Workshop on Automatic Speech Recognition and Understanding (ASRU) 2003. St. Thomas, U.S. Virgin Islands, Dec. 2003, pp. 465-470.

Berger, Tracy D. et al., "Reading Quickly in the Periphery—the Roles of Letters and Sentences," Draft 36, Journal of Vision (submitted Apr. 29, 2004), http://journalofvision.org, available at: http://www.psych.nyu.edu/pelli/docs/peripheralreading36.pdf.

Bishop, M.J. et al., "Nucleic Acid and Protein Sequence Analysis, A Practical Approach," IRL Press 1987.

Byrne, Julian "My Spamblock," Google Groups Thread, Jan. 19, 1997.

Collins, J.F. et al., "Molecular Sequence Comparison and Alignment," Nucleic Acid and Protein Sequence Analysis: A Practical Approach, IRL Press, Washington DC, 1987, pp. 323-358.

Collins, M.S. and Oliver, J.J., "Efficient Induction of Finite State Automata," D. Geiger, P. P. Sheno, eds. Proceedings of the Thirteenth Conference on Uncertainty in Artificial Intelligence, Aug. 1-3, 1997, Brown University, Providence, Rhode Island, USA, San Francisco, CA: Morgan Kaufmann Publishers, 1997, pp. 99-107.

Cranor, Lorrie et al., "Spam!," Communications of the ACM, vol. 41, Issue 8, pp. 74-83, Aug. 1998.

Davis, Matt. According to a research at Cambridge University, it doesn't matter in what order the letters in a word are http://www.mrc-cbu.cam.ac.uk/personal/matt.davis/Cmabrigde.

Dwork, Cynthia et al., "Pricing via Processing or Combating Junk Mail," CRYPTO '92, Springer-Verlag LNCS 740, pp. 139-147, 1992.

Dwyer, Kelly Pate. "New Legal Fears Prod Web Spies." DenverPost.com. May 17, 2004. <http://www.denverpost.com/Stories/0.1413.36-33-2152818.00.html>.

Fisher, Vivienne. "Security Holes: the Danger Within." ZDNet (Australia). Jun. 12, 2002. <http://news.zdnet.co.uk/business/manaaement/0.39020654.2111703.00.htm>.

Gaudin, Sharon. "Security Begins From Within." eSecurityPlanet. com. Aug. 4, 2003. <http://www.esecurityplanet.com/trends/article.php/2244131 >.

Gomes, Luiz et al., "Characterizing a Spam Traffic," in the Proc. of the 4th ACM SIGCOMM Conference on Internet Measurement, Sicily, Italy, pp. 356-369, 2004.

Gouy, Manolo "Secondary Structure Prediction of RNA," Nucleic Acid and Protein Sequence Analysis: a Practical Approach, chapter 11, pp. 259283 IRL Press, Oxford, 1987.

Graham, Paul. "A Plan for Spam." Aug. 2002. <http://paulgraham.com/spam.html>.

Graham, Paul. "Better Bayesian Filtering." Jan. 2003. <http//:paulgraham.com/better.html>.

Graham-Cummings, John. "How to beat an Adaptive Spam Filter." MIT Spam Conference, Cambridge, Massachusetts, Jan. 16, 2004. <http://www.igc.org/SpamConference011604.pps>.

Guilmette, Ronald F., "To Mung or Not to Mung," Google Groups Thread, Jul. 24, 1997.

Jaques, Robert. "IT Fuels Intellectual Property Theft." Personal Computer World. Feb. 20, 2004. <http://www.pcw.co.uk/News/1152924>.

Langberg, Mike "Spam Foe Needs Filter of Himself," Email Thread dtd. Apr. 5, 2003.

(56) References Cited

OTHER PUBLICATIONS

Lucas, Simon M. "Evolving Finite State Transducers: Some Initial Explorations," in Proceedings of 6th European Conference on Genetic Programming, pp. 130-141, 2003, http://www.algoval.essex.ac.uk/rep/fst/EuroFST.pdf.
McCullagh, Declan "In-Boxes that Fight Back," News.com, May 19, 2003.
Pantel, Patrick and Dekang Lin. "SpamCop: A Spam Classification & Organization Program." Poster in Proceedings of AAAI—1998 Workshop on Learning for Text Categorization, Jul. 1998.
Peled, Ariel "Five Steps Your Company Can Take to Keep Information Private" Computerworld. Mar. 15, 2004. <http://www.computerworld.com/securitytopics/security/story/0.10801.91251.00.html>.
Pescatore, John. "High-Profile Thefts Show Insiders Do the Most Damage." Gartner First Take. FT-18-9417. Nov. 26, 2002. <http://www.sim2k.com/New/pdfs/Gartner%20Trust%20but%20Verify%20mention.pdf>.
Rawlinson, Graham. "The Significance of Letter Position in Word Recognition" Ph.D. Thesis, Nottingham University, 1976. <http://www.mrc-cbu.cam.ac.uk/personal/matt.davis/Cmabriade/rawlinson.html>.
Ristad, Eric Sven et al., "Learning String Edit Distance," Learning String Distance, 1997, IEEE Transactions on Pattern Analysis and Machine Intelligence, http://www.pnylab.com/pny/papers/sed/sed.pdf.
Sahami, Mehran, et. al "A Bayesian Approach to Filtering Junk E-MaiL" Proceedings of AAAI—1998 Workshop on Learning for Text Categorization, Jul. 1998.
Skoll, David F., "How to Make Sure a Human is Sending You Mail," Google Groups Thread, Nov. 17, 1996.
Templeton, Brad "Viking-12 Junk E-Mail Blocker," (believed to have last been updated Jul. 15, 2003).
Totty, Michael. "The Dangers in Outbound E-mail" The Wall Street Journal. Apr. 26, 2004. p. R6.
Vamosi, Robert. "Centralize Security for Success" ZDNet (UK). Nov. 6, 2001 <http://zdnet.com.com/2100-1107-531024.html>.
Von Ahn, Luis et al., "Telling Humans and Computers Apart (Automatically) or How Lazy Cryptographers do AI," Communications to the ACM, Feb. 2004.
Weinstein, Lauren "Spam Wars," Communications of the ACM, vol. 46, Issue 8, p. 136, Aug. 2003.
Yerazunis, Bill. "Sparse Binary Polynomial Hash Message Filtering and the CRM114 Discriminator." Proceedings of the 2003 Spam Conference, Cambridge, Massachusetts, Jan. 2003. <http://spamconference.org/proceedings2003.html>.
U.S. Appl. No. 11/036,603 Final Office Action mailed Dec. 17, 2013.
U.S. Appl. No. 11/036,603 Office Action mailed Jun. 5, 2013.
U.S. Appl. No. 11/036,603 Final Office Action mailed Nov. 28, 2008.
U.S. Appl. No. 11/036,603 Office Action mailed May 30, 2008.
U.S. Appl. No. 11/927,466 Final Office Action mailed Oct. 22, 2013.
U.S. Appl. No. 11/927,466 Office Action mailed Feb. 27, 2013.
U.S. Appl. No. 11/927,466 Final Office Action mailed Jul. 9, 2010.
U.S. Appl. No. 11/927,466 Office Action mailed Dec. 23, 2009.
U.S. Appl. No. 11/927,466 Final Office Action mailed Jul. 9, 2009.
U.S. Appl. No. 11/927,466 Office Action mailed Dec. 24, 2008.
U.S. Appl. No. 10/869,507 Final Office Action mailed Jun. 23, 2009.
U.S. Appl. No. 10/869,507 Office Action mailed Dec. 9, 2008.
U.S. Appl. No. 10/869,507 Final Office Action mailed Jul. 15, 2008.
U.S. Appl. No. 10/869,507 Office Action mailed May 1, 2008.
U.S. Appl. No. 10/869,507 Office Action mailed Jan. 9, 2008.
U.S. Appl. No. 11/927,458 Office Action mailed Oct. 15, 2014.
U.S. Appl. No. 11/927,458 Final Office Action mailed Dec. 11, 2008.
U.S. Appl. No. 11/927,458 Office Action mailed Sep. 5, 2008.
U.S. Appl. No. 11/927,458 Office Action mailed Dec. 4, 2015.

* cited by examiner

200

202 — To: email@mailfrontier.com, bob@mailfrontier.com
From: JohnDoe@mailfrontier.com
Subject: Health insurance enrollment    [Send]

204 — Name: John Doe    Age: 30
206 — Social security number: 123-45-6789
Address:    123 Main Street
            Anytown, USA 208 — ☐ Restrict distribution of the entire message Distribution configuration 210 —
☐ Internal ☑ Recipient ☑ Human Resources ☐ Sales ☐ Engineering

MESSAGE DISTRIBUTION CONTROL

CROSS-REFERENCE TO RELATED APPLICATIONS

The present application is a continuation and claims the priority benefit of U.S. patent application Ser. No. 11/036,603 filed Jan. 14, 2005, now U.S. Pat. No. 8,886,727 that issued on Nov. 11, 2014. The present application also claims the priority benefit of U.S. provisional application 60/642,266 filed Jan. 5, 2005, U.S. provisional application 60/578,135 filed Jun. 8, 2004, U.S. provisional application 60/543,300 filed Feb. 9, 2004, and U.S. provisional application 60/539,615 filed Jan. 27, 2004, the disclosures of which are incorporated herein by reference.

FIELD OF THE INVENTION

The present invention relates generally to electronic communications. More specifically, message distribution is disclosed.

BACKGROUND OF THE INVENTION

Businesses and organizations today are becoming increasingly dependent on various forms of electronic communication such as email, instant messaging, etc. The same characteristics that make electronic messages popular—speed and convenience—also make them prone to misuse. Confidential or inappropriate information can be easily leaked from within an organization. A breach of confidential information may be caused inadvertently or purposefully. Unauthorized information transmission can lead to direct harm such as lost revenue, theft of intellectual property, additional legal cost, as well as indirect harm such as damage to the company's reputation and image.

Although some studies show that over half of information security incidents are initiated from within organizations, currently security products for preventing internal security breaches tend to be less sophisticated and less effective than products designed to prevent external break-ins such as spam filters, intrusion detection systems, firewalls, etc. There are a number of issues associated with the typical internal security products that are currently available. Some of the existing products that prevent inappropriate email from being sent use filters to match keywords or regular expressions. Since system administrators typically configure the filters to block specific keywords or expressions manually, the configuration process is often labor intensive and error-prone.

Other disadvantages of the keyword and regular expression identification techniques include high rate of false positives (i.e. legitimate email messages being identified as inappropriate for distribution). Additionally, someone intent on circumventing the filters can generally obfuscate the information using tricks such as word scrambling or letter substitution. In existing systems, the sender of a message is in a good position to judge how widely certain information can be circulated. However, the sender often has little control over the redistribution of the information. It would be desirable to have a product that could more accurately and efficiently detect protected information in electronic messages and prevent inappropriate distribution of such information. It would also be useful if the product could give message senders greater degrees of control over information redistribution, as well as identify messages that are sent between different parts of an organization.

SUMMARY OF THE PRESENTLY CLAIMED INVENTION

A method of controlling redistribution of content in a message sent by a message sender includes a step of receiving over a network from a mail client a first message created by a first message sender. The first message includes a text string manually marked by the first message sender as confidential content upon which a distribution limit should be placed. The first message also includes a distribution limit manually set by the first message sender identifying one or more users authorized to recirculate the confidential content. The method further includes a step of receiving over the network from a mail client a second message subsequent to the first message. The second message is distinct from the first message and created by a second message sender who is distinct from the first message sender. The second message includes an identification of the second message sender.

The method further includes a step of executing instructions stored in memory that, when executed, add the text string manually marked by the first message sender and the distribution limit manually set by the first message sender to a database stored in memory. The method further includes examining the second message for the stored text string manually marked by the first message sender. Examining the second message includes extracting a suspicious text string from the second message and comparing the suspicious text string to the stored text string manually marked by the first message sender. The method also includes examining the second message for the one or more users identified in the stored distribution limit manually set by the first message sender as authorized to recirculate the confidential content. The examination occurs when the suspicious text string matches the stored text string manually marked by the first message sender.

Examining the second message includes extracting the identification of the second message sender and comparing the identification of the second message sender to the one or more users identified in the stored distribution limit manually set by the first message sender as authorized to recirculate the confidential content. The method further includes transmitting the second message over the network when the identification of the second message sender matches one of the one or more users identified in the stored distribution limit manually set by the first message sender as users authorized to recirculate the confidential content.

A computing device that controls redistribution of content in a message sent by a message sender includes a processor, a network interface communicatively coupled to a communications network, memory storing a database, and executable instructions, whereby execution of the instructions by the processor cause the processor to perform the forgoing method of controlling redistribution of content in a message sent by a message sender. A non-transitory computer-readable storage medium also include a program executable by a computer processor to perform the foregoing method.

BRIEF DESCRIPTION OF THE DRAWINGS

Various embodiments of the invention are disclosed in the following detailed description and the accompanying drawings.

FIG. 2 is a diagram illustrating the user interface of a mail client embodiment.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method and system for controlling distribution of protected content is disclosed. In some embodiments, the message sender sends an indication that a message is to be protected. The message sender may identify a portion of the message as protected content. The protected content is added to a database. If a subsequently received message is found to include content that is associated with any protected content in the database, the system takes actions to prevent protected content from being distributed to users who are not authorized to view such content. Content in a message that is similar but not necessarily identical to the protected content is detected using techniques such as computing a content signature or a hash, identifying a distinguishing property in the message, summarizing the message, using finite state automata, applying the Dynamic Programming Algorithm or a genetic programming algorithm, etc.

Figure 1:
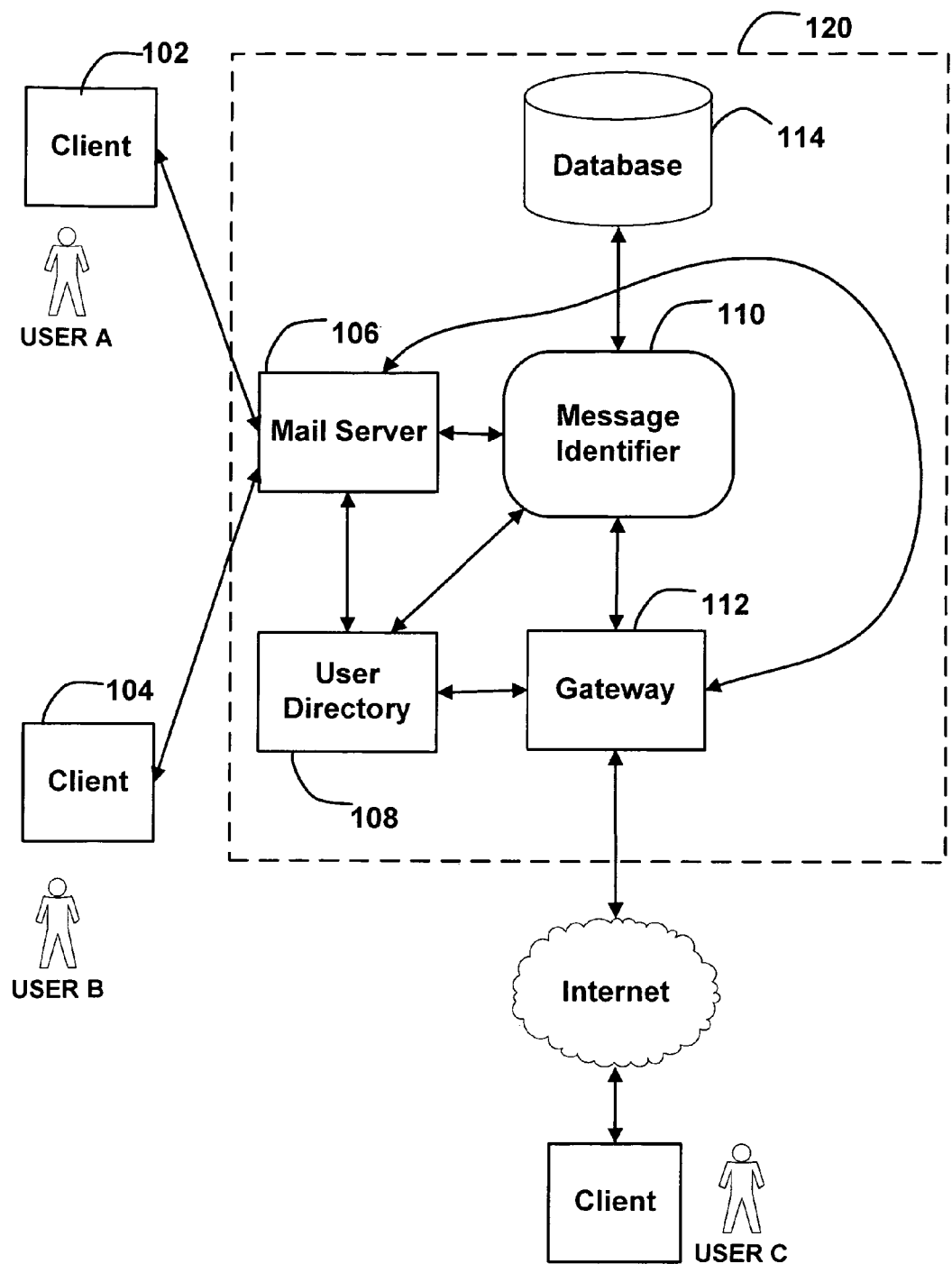
FIG. 1 is a system diagram illustrating a message distribution control system embodiment.

FIG. 1 is a system diagram illustrating a message distribution control system embodiment. For purposes of illustration, distribution control of email messages is described throughout this specification. The techniques are also applicable to instant messages, wireless text messages or any other appropriate electronic messages. In this example, mail clients such as 102 and 104 cooperate with server 106. A user sending a message via a mail client can indicate whether the message or a selected portion of the message is to be protected. As used herein, a piece of protected content may include a word, a phrase, a sentence, a section of text, or any other appropriate string. Besides the intended recipients, the user can also specify a set of users who are authorized to recirculate the protected content. The authorized users and the recipients may overlap but are not necessarily the same. In this example, the mail server cooperates with a user directory 108 to facilitate the specification of authorized users. Mail server 106 extracts the protected content information and recipient information, and stores the information in a database 114.

Received messages are tested by message identifier 110 based on data stored in database 114, using identification techniques which are described in more detail below. A message identified as containing protected content is prevented from being sent to any user besides the set of authorized users associated with the protected content. In some embodiments, mail server 106 or gateway 112, or both, also automatically prevent restricted information from being sent to users outside the organization's network. Components of backend system 120 may reside on the same physical device or on separate devices.

FIG. 2 is a diagram illustrating the user interface of a mail client embodiment. In this example, mail client interface 200 includes areas 202 and 204 used for entering the standard message header and message body. Additionally, the user interface allows the user to selectively protect the entire message or portions of the message. For instance, by checking checkbox 208, the sender can indicate that the distribution of the entire message is to be restricted. Alternatively, the user may select a portion or portions of the message for protection. In the example shown, the sender has highlighted section 206, which contains sensitive information about an employee. The highlighted portion is marked for protection. In some embodiments, special marks are inserted in the message to define the protected portions. Special headers that describe the start and end positions of the protected text may also be used.

Configuration area 210 offers distribution control options. In this example, five options are presented: if selected, the "internal" option allows the message to be redistributed inside the corporate network, "recipient" allows the message to be redistributed among the recipients, "human resources", "sales", and "engineering" options allow redistribution only among users within the respective departments. In some embodiments, the mail client queries a user directory to obtain hierarchical information about the user accounts on the system, and presents the information in the distribution control options. In some embodiments, the mail client allows the user to configure custom distribution lists and includes the custom distribution lists in the control options. Some embodiments allow permission information to be set. The permission information is used to specify the destinations and/or groups of recipients who are allowed to receive the information. For example, a sender may permit a message only to be sent to specific destinations, such as recipients with a certain domain, subscribers who have paid to receive the message, registered users of a certain age group, etc.

Figure 3:
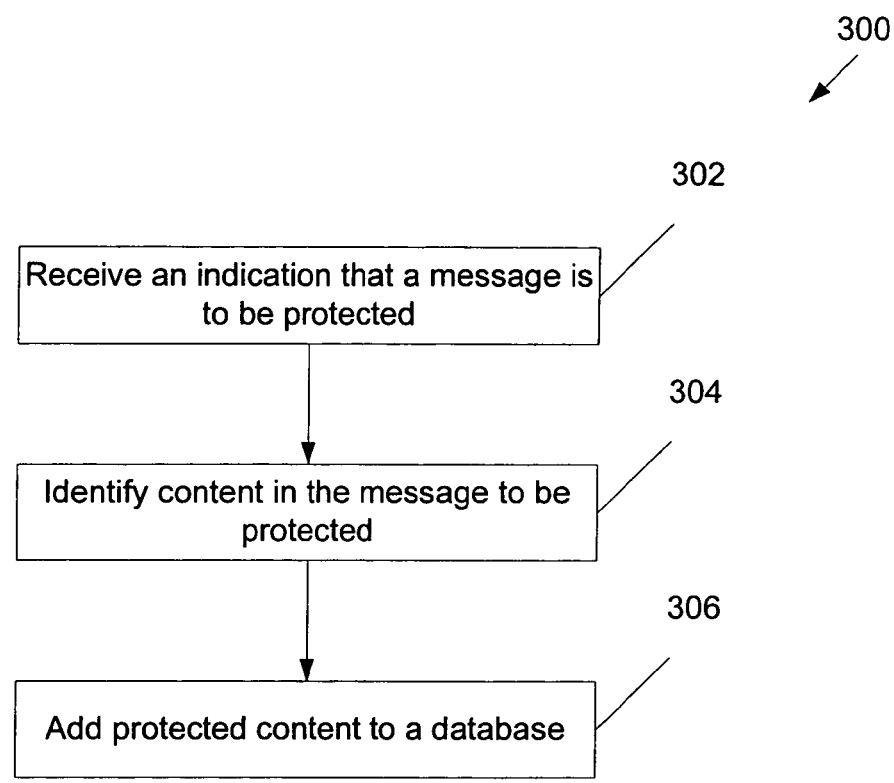
FIG. 3 is a flowchart illustrating a message processing operation according to some embodiments.

FIG. 3 is a flowchart illustrating a message processing operation according to some embodiments. Process 300 shown in this example may be performed on a mail client, on a mail server, on a message identification server, on any other appropriate device or combinations thereof. At the beginning, an indication that a message is to be protected is received 302. The indication may be sent along with the message or separately. The content in the message to be protected is then identified 304. The protected content is then added to a database 306. In some embodiments, the protected content is processed and the result is added to the database. For example, spell check and punctuation removal are performed in some embodiments. The process can be repeated multiple times for different messages with different protected content. Optionally, permission information may also be added to the database.

Figure 4:
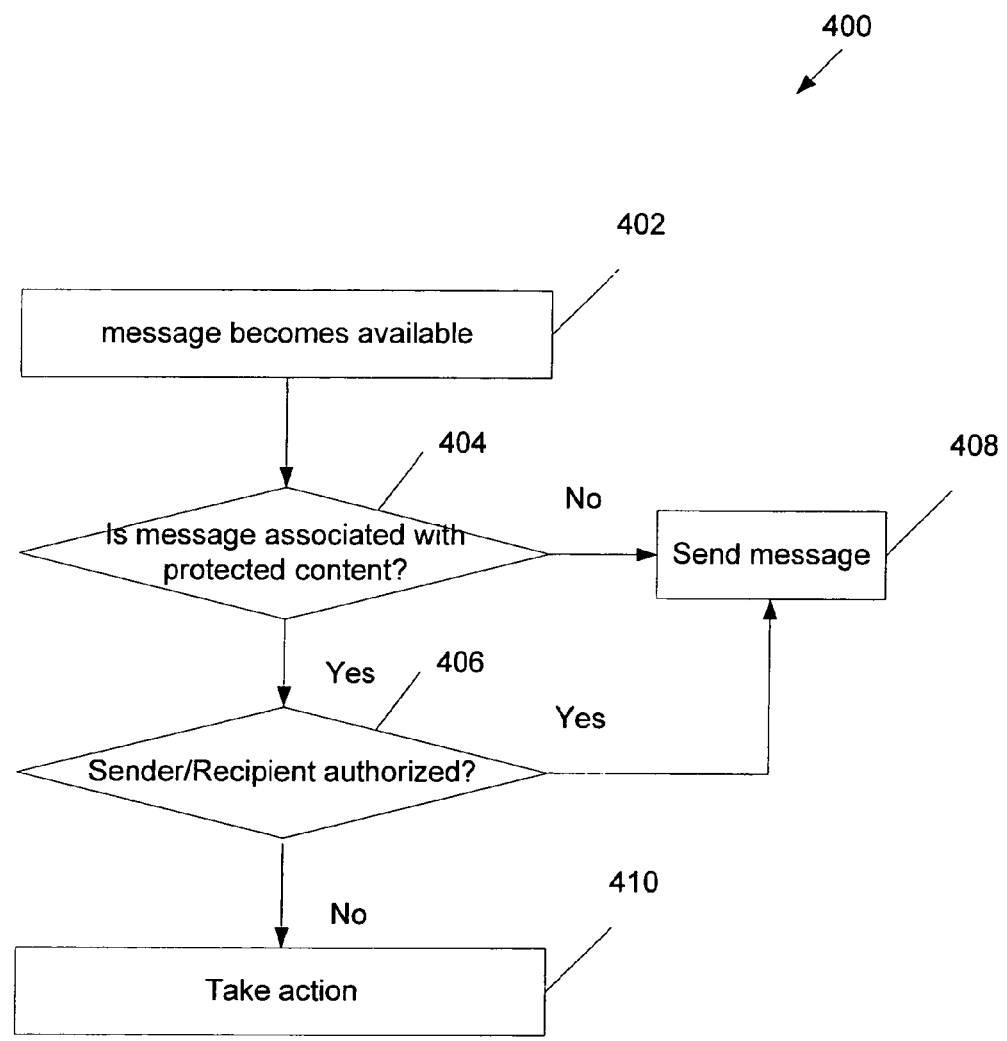
FIG. 4 is a flowchart illustrating the examination of a message before it is transmitted to its designated recipient, according to some embodiments.

When subsequent messages are to be sent by the mail server, they are examined for protected content. FIG. 4 is a flowchart illustrating the examination of a message before it is transmitted to its designated recipient, according to some embodiments. Process 400 may be performed on a mail client, on a mail server, on a message identification server, on any other appropriate device or combinations thereof. The message identifier component may be an integral part of the mail server or a separate component that cooperates with the mail server. In this example, a message becomes available for transmission 402. It is determined whether the message is associated with any protected content in the database 404. A message is associated with protected content if it includes one or more sections that convey the same information as some of the protected content. A user intent on distributing unauthorized information can sometimes mutate the text to avoid detection. Letter substitution (e.g. replacing letter "a" with "@", letter "O" with number "0", letter "v" with a backward slash and a forward slash "\/"), word scrambling, intentional misspelling and punctuation insertion are some of the tricks used to mutate text into a form that will escape many keyword/regular expression filters but still readable by the human reader. For example, "social security number: 123-45-6789" can be mutated as "sOcial sceurity #: 123*45*6789" (where letter "l" is replaced with number "1" and vice versa), "CEO John Doe resigned" can be mutated as "CE0 J0hn Doe res!ngĕd". By using appropriate content identification techniques (such as lexigraphical distancing described below), text that is not identical to the protected content but conveys the similar information can be identified.

If the message is not associated with any protected content in the database, it is deemed safe and is sent to its intended recipient 408. If, however, the received message is associated with a piece of protected content, it is determined whether each of the recipients is authorized to view the protected content by the content's original author 406. Optionally, it is determined whether the sender of the message under examination is authorized by the original sender of the protected content to send such content to others. The message is sent to the recipient if the recipient is authorized to view the protected content and if the sender is authorized to send the message. If, however, a recipient (or the sender) is not authorized, certain actions are taken 410. Examples of such actions include blocking the message from the unauthorized recipient, quarantining the message, sending a notification to the sender or a system administrator indicating the reason for blocking, etc. For instance, a new message that contains information about John Doe's social security number and address will be identified as being associated with protected content. If one of the recipients of this message is in the human resources department, he will be allowed to receive this message since the original sender of the confidential information had indicated that users from human resources department are authorized to send and receive this information. If, however, another recipient is in the sales department, he will be blocked from receiving the new message. Furthermore, if someone in the sales department obtains John Doe's social security number through other means and then attempts to email the information to others, the message will be blocked because the original sender only permitted users in the human resources department to send and receive this information. Alerts may be sent to the message sender and/or system administrator as appropriate. In some embodiments, the system optionally performs additional checks before the message is sent.

Figure 5:
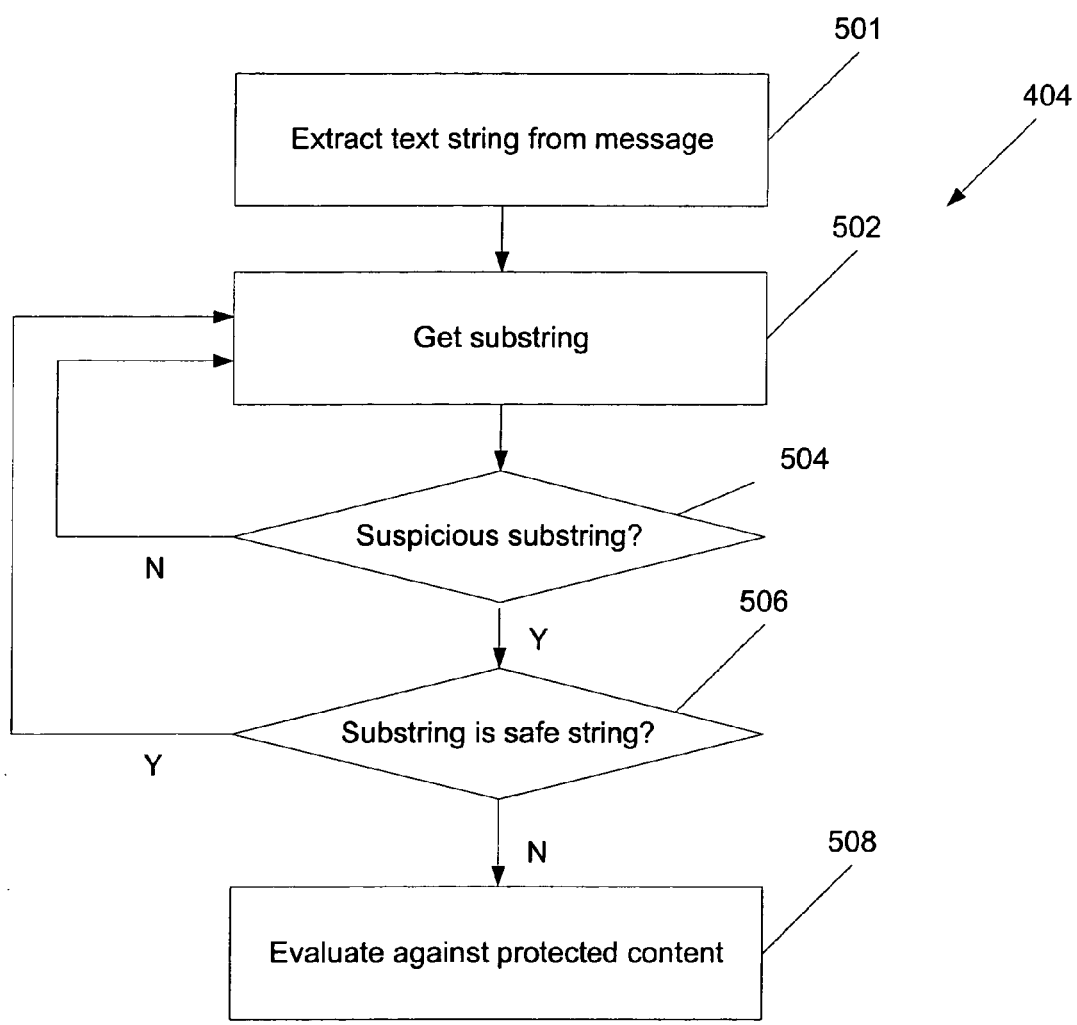
FIG. 5 is a flowchart illustrating a process for determining whether a message is associated with particular protected content.

FIG. 5 is a flowchart illustrating a process for determining whether a message is associated with particular protected content. In this example, a text string is extracted from a message 501. The implementation of the extraction process varies for different implementations. In some embodiments, the text string includes plaintext extracted from the "text/plain" and "text/html" text parts of a received message. In some embodiments, it is a line delimited by special characters such as carriage return, linefeed, ASCII null, end-of-message, etc. The string is sometimes preprocessed to eliminate special characters such as blank spaces and punctuations. A substring is obtained from the text string 502. The substring is examined to determine whether it includes any suspicious substring that may be the protected content in a mutated form 504. Different embodiments may employ different techniques for detecting a suspicious substring. For example, in some embodiments if the first and last letters of a substring match the first and the last letters of the protected content, and if the substring has approximately the same length as the protected content, the substring is deemed suspicious. If the substring is not suspicious, the next substring in the text string, if available, is obtained 502 and the process is repeated.

If the substring is found to be suspicious, it is determined whether the suspicious substring is a safe string 506. A safe string is a word, a phrase, or an expression that may be present in the message for legitimate reasons. Greetings and salutations are some examples of safe strings. If the suspicious string is a safe string, the next available substring in the text is obtained 502 and the process is repeated. If, however, the suspicious string is not a safe string, it is evaluated against the protected content (508). In some embodiments, the evaluation yields a score that indicates whether the substring and the protected content approximately match. The evaluation is sometimes performed on multiple substrings and/or multiple protected content to derive a cumulative score. An approximate match is found if the score reaches a certain preset threshold value, indicating that the suspicious string approximately matches the protected content.

Figure 6:
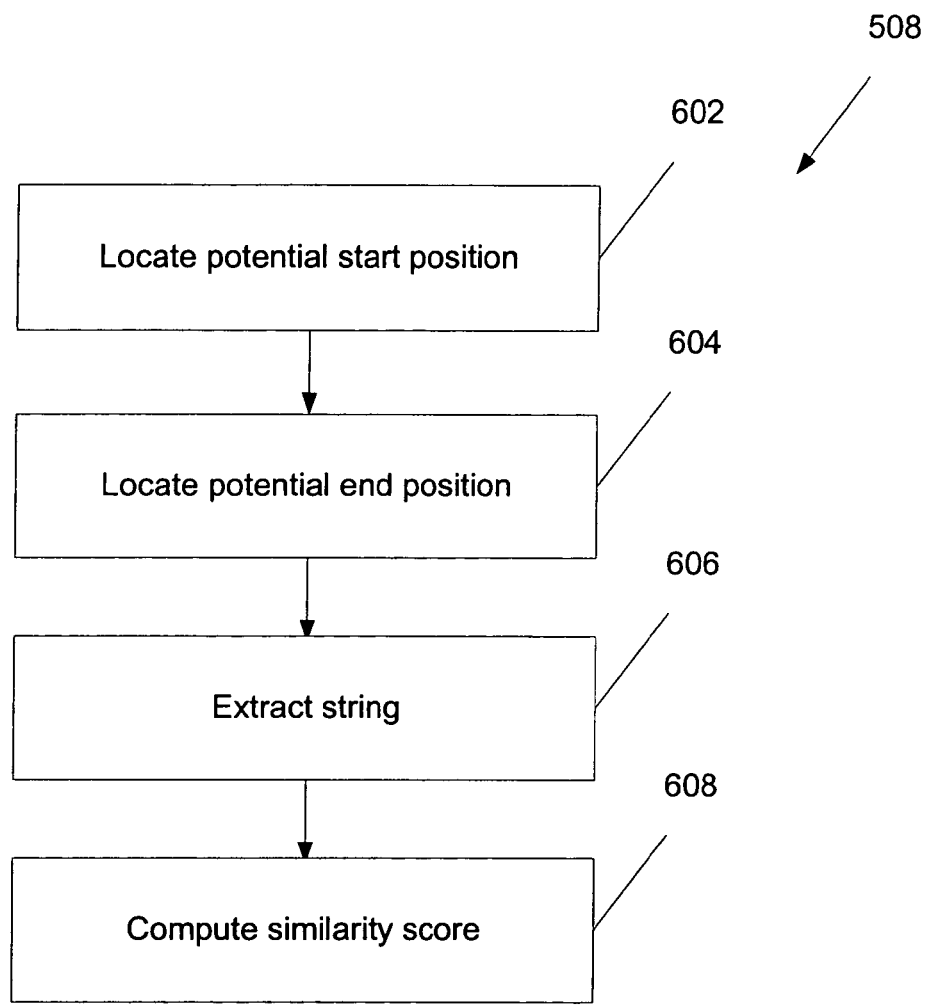
FIG. 6 is a flowchart illustrating a lexigraphical distancing process according to some embodiments.

Protected content may be mutated by inserting, deleting or substituting one or more characters or symbols (sometimes collectively referred to as tokens) in the string of the protected content, scrambling locations of tokens, etc. The resulting string conveys the same information to the human reader as the protected content. To detect protected content that has been mutated, a lexigraphical distancing process is used in some embodiments to evaluate the similarity between a suspicious string and the protected content. FIG. 6 is a flowchart illustrating a lexigraphical distancing process according to some embodiments. The technique is applicable to email messages as well as other forms of textual documents that include delimiters such as spaces, new lines, carriages returns, etc. In this example, the potential start position of the protected content (or its mutated form) is located 602. In some embodiments, the potential start position is located by finding the first character of the protected content or by finding an equivalent token to the first character. If possible, a potential end position is located by finding the last character of the protected content or an equivalent token 604. As used herein, an equivalent token includes one or more characters or symbols that can be used to represent a commonly used character. For example, the equivalent tokens for "c" include "c", "C", "Ć", "ć", " ", "Ç", "ĉ", etc., and the equivalent tokens for "d" include "d", "D", "Ď", "Đ", "đ", etc. Thus, if "CEO resigned" is the protected content under examination, the start position for a suspicious string is where "c", "C", "Ć", "ć", "Ĉ", or "ĉ" is found and the end position is where "d", "D", "Ď", "Đ", or "đ" is found. The length between the potential start position and the potential end position is optionally checked to ensure that the length is not greatly different from the length of the protected content. Sometimes the potential start and end positions are expanded to include some extra tokens such as spaces and punctuations.

The string between the potential start and end position is then extracted (606). In some embodiments, if a character, a symbol or other standard token is obfuscated by using an equivalent token, the equivalent token is identified before the string is further processed. The equivalent token is replaced by the standard token before further processing. For example, "\/" (a forward slash and a backslash) is replaced by "v" and "|-|" (a vertical bar, a dash and another vertical bar) is replaced by "H". An edit distance that indicates the similarity between the suspicious string and the protected content is then computed 608. In this example, the edit distance is represented as a score that measures the amount of mutation required for transforming the protected content to the suspicious string by inserting, deleting, changing or otherwise mutating characters. The score may be generated using a variety of techniques, such as applying the Dynamic Programming Algorithm (DPA), a genetic programming algorithm or any other appropriate methods to the protected content and the suspicious string. For the purpose of illustration, computing the score using DPA is discussed in further detail, although other algorithms may also be applicable.

In some embodiments, the Dynamic Programming Algorithm (DPA) is used for computing the similarity score. In one example, the DPA estimates the edit distance between two strings by setting up a dynamic programming matrix. The matrix has as many rows as the number of tokens in the protected content, and as many columns as the length of the suspicious string. An entry of the matrix, Matrix (I, J), reflects the similarity score of the first I tokens in the protected content against the first J tokens of the suspicious string. Each entry in the matrix is iteratively evaluated by taking the minimum of V1, V2 and V3, which are computed as the following:

$V1=\text{Matrix}(I-1,J-1)+\text{TokenSimilarity}(\text{ProtectedContent}(I),\text{SuspiciousString}(J))$ $V2=\text{Matrix}(I-1,J)+\text{CostInsertion}(\text{ProtectedContent}(I))$ $V3=\text{Matrix}(I,J-1)+\text{CostDeletion}(\text{SuspiciousString}(J))$ The similarity of the protected content and the suspicious string is the matrix entry value at Matrix(length(ProtectedContent), length(SuspiciousString)). In this example, the TokenSimilarity function returns a low value (close to 0) if the tokens are similar, and a high value if the characters are dissimilar. The CostInsertion function returns a high cost for inserting an unexpected token and a low cost for inserting an expected token. The CostDeletion function returns a high cost for deleting an unexpected token and a low cost for deleting an expected token.

Prior probabilities of tokens, which affect similarity measurements and expectations, are factored into one or more of the above functions in some embodiments. The TokenSimilarity, CostInsertion and CostDeletion functions may be adjusted as a result. In some embodiments, the prior probabilities of the tokens correspond to the frequencies of characters' occurrence in natural language or in a cryptographic letter frequency table. In some embodiments, the prior probabilities of the tokens in the protected content correspond to the actual frequencies of the letters in all the protected content, and the prior probabilities of the tokens in the message correspond to the common frequencies of letters in natural language. In some embodiments, the prior probabilities of tokens in the protected content correspond to the actual frequencies of the tokens in the protected content, and the prior probabilities of the different tokens in the message correspond to the common frequencies of such tokens in sample messages previously collected by the system.

In some embodiments, the context of the mutation is taken into account during the computation. A mutation due to substitution of special characters (punctuations, spaces, non-standard letters or numbers) is more likely to be caused by intentional obfuscation rather than unintentional typographical error, and is therefore penalized more severely than a substitution of regular characters. For example, "esigned" is penalized to a greater degree than "resighed". Special characters immediately preceding a string, following a string, and/or interspersed within a string also indicate that the string is likely to have been obfuscated, therefore an approximate match of protected content, if found, is likely to be correct. For example, "C*E*O re*sighned*" leads to an increase in the dynamic programming score because of the placements of the special characters.

In some embodiments, the edit distance is measured as the probability that the suspicious content being examined is an "edited" version of the protected content. The probability of insertions, deletions, substitutions, etc. is estimated based on the suspicious content and compared to a predetermined threshold. If the probability exceeds the threshold, the suspicious content is deemed to be a variant of the protected content.

Sometimes the protected content is mutated by substituting synonymous words or phrases. The evaluation process used in some embodiments includes detecting whether a substring is semantically similar (i.e. whether it conveys the same meaning using different words or phrases) to the protected content. For example, a message includes a substring "CEO left". The examination process generates semantically similar substrings, including "CEO quit", "CEO resigned", etc., which are compared with the protected content in the database. If "CEO resigned" is included in the database as protected content, the substring will be found to be semantically similar with respect to the protected content.

Figure 7:
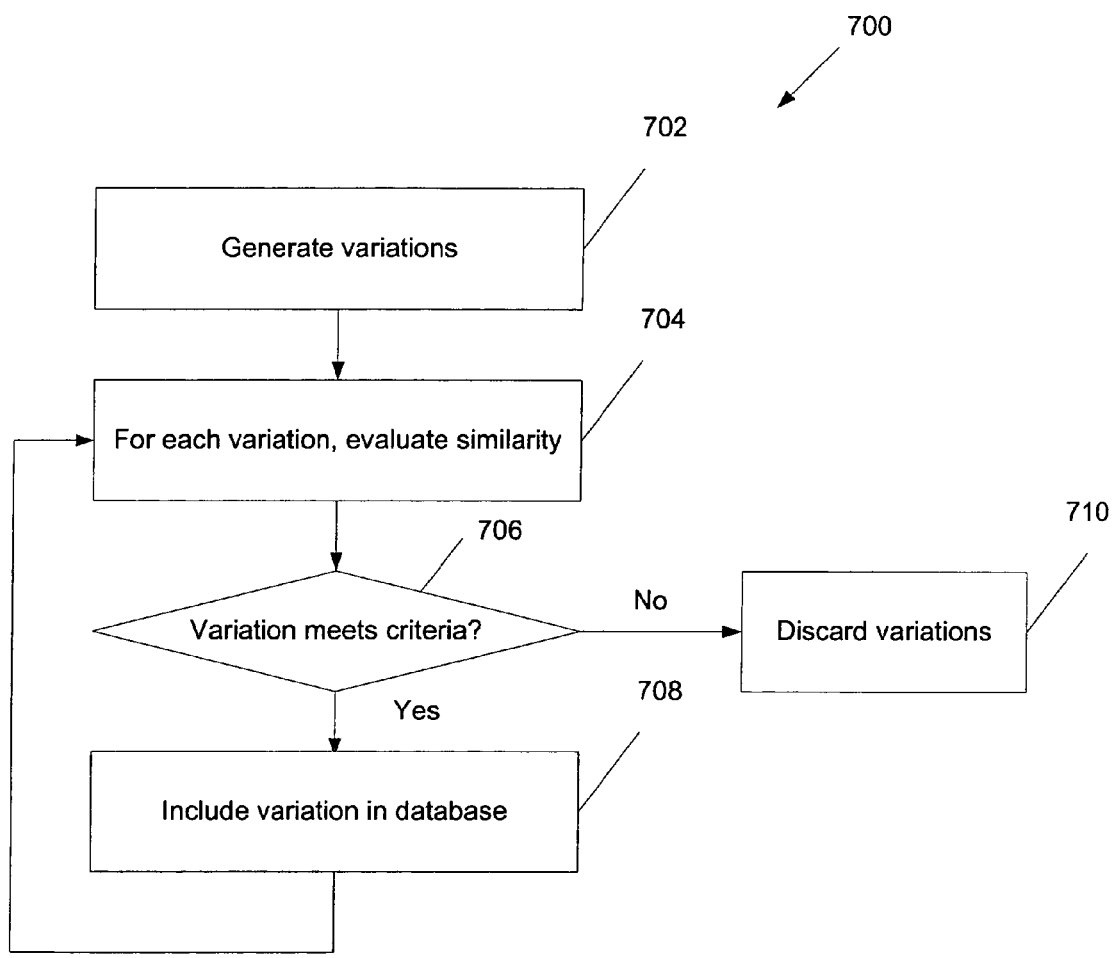
FIG. 7 is a flowchart illustrating a process for generating a database of protected content according to some embodiments.

In some embodiments, the database of protected content includes variations of special terms of interest. The variations may be lexigraphically similar and/or semantically similar with respect to the special terms. FIG. 7 is a flowchart illustrating a process for generating a database of protected content according to some embodiments. In the example shown, variations of an original term of interest are generated 702. For example, if the original term is "CEO resigned", then variations such as "CEO resigns", "CE0 resigns", "CEO quit", "CEO qu!ts", "C*E*O left" and other possible mutations are generated. These variations may be generated using combinatorial techniques to generate permutations of the original term, using genetic programming techniques to generate mutations of the original term, or using any other appropriate techniques. For each of the variations, the similarity between the variation and the original term is evaluated 704. The similarity may be measured as an edit distance between the variation and the original term, and evaluated using techniques such as DPA, genetic programming algorithm or any other appropriate techniques. If the variation meets a certain criteria (e.g. if the similarity score is above a certain threshold) 706, it is then included in the protected content database 708. Otherwise, the variation is discarded 710. In some embodiments, the process also includes an optional check to eliminate any safe words. Thus, although "designed" may be lexigraphically similar to "resigned" in terms of edit distance, "designed" is deemed to be a safe word and is not included in the protected content database. Process 700 may be repeated for various special terms of interest. The resulting database includes variations that can be used to represent the original term. During operation, portions of the message are compared with terms in the collection to determine whether there is a match. In some embodiments, a score is then computed based on how similar the matching term is with respect to the original term.

A content distribution control technique has been disclosed. In addition to dynamic programming and genetic programming algorithms, content in a message that is similar to certain protected content can be detected by calculating a signature of the content under examination and comparing the signature to signatures of the protected content, identifying one or more distinguishing properties in the message and comparing the distinguishing properties (or their signatures) to the protected content (or their signature), summarizing the message and comparing the summary with the summary of the protected content, applying finite state automata algorithm, or any other appropriate techniques.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of controlling redistribution of content in a message sent by a message sender via a computing device, the method comprising:
   receiving over a network from a mail client a first message created by a first message sender, the first message received at the computing device and including:
      a text string manually marked by the first message sender as confidential content upon which a distribution limit should be placed, and
      the distribution limit manually set by the first message sender identifying one or more users authorized to recirculate the confidential content;
   receiving over the network from a mail client a second message subsequent to the first message, the second message received at the computing device, wherein the second message is distinct from the first message and created by a second message sender who is distinct from the first message sender, and the second message includes an identification of the second message sender; and
   executing instructions stored in memory of the computing device, wherein execution of the instructions by a processor of the computing device:
      adds the text string manually marked by the first message sender and the distribution limit manually set by the first message sender to a database stored in memory,
      examines the second message for the stored text string manually marked by the first message sender, wherein examining the second message includes extracting a suspicious text string from the second message and comparing the suspicious text string to the stored text string manually marked by the first message sender,
      examines the second message for the one or more users identified in the stored distribution limit manually set by the first message sender as authorized to recirculate the confidential content, wherein the examination occurs when the suspicious text string matches the stored text string manually marked by the first message sender, and wherein examining the second message includes extracting the identification of the second message sender and comparing the identification of the second message sender to the one or more users identified in the stored distribution limit manually set by the first message sender as authorized to recirculate the confidential content, and
      transmits the second message over the network when the identification of the second message sender matches one of the one or more users identified in the stored distribution limit manually set by the first message sender as users authorized to recirculate the confidential content.

2. The method of claim 1, wherein the suspicious text string is a mutate form of the stored text string manually marked by the first message sender.

3. The method of claim 1, wherein the first and second messages are email messages.

4. The method of claim 1, wherein the first message further includes an indication manually set by the first message sender marking the entire first message as confidential content upon which the distribution limit should be placed.

5. The method of claim 1, wherein execution of the instructions by the processor of the computing device further quarantines the second message when the identification of the second message sender does not match the one or more users identified in the stored distribution limit manually set by the first message sender as authorized to recirculate the confidential content.

6. The method of claim 1, wherein execution of the instructions by the processor of the computing device further transmits a portion of the second message that does not include the suspicious text string when the identification of the second message sender does not match the one or more users identified in the stored distribution limit manually set by the first message sender as authorized to recirculate the confidential content.

7. The method of claim 1, wherein execution of the instructions by the processor of the computing device further sends a notification to the second message sender when the suspicious text string matches the stored text string manually marked by the first message sender.

8. The method of claim 1, wherein execution of the instructions by the processor of the computing device further permits the second message to be transmitted to both authorized and unauthorized recipients when the suspicious text string does not match the stored text string manually marked by the first message sender.

9. The method of claim 1, wherein comparing the suspicious text string to the stored text string manually marked by the first message sender includes determining an edit distance between a sub string of the suspicious text string and the stored text string manually marked by the first message sender.

10. The method of claim 1, wherein comparing the suspicious text string to the stored text string manually marked by the first message sender includes comparing the suspicious text string to a sub string that is semantically similar to the stored text string manually marked by the first message sender.

11. The method of claim 1, wherein comparing the suspicious text string to the stored text string manually marked by the first message sender includes comparing a signature of the suspicious text string with the stored text string manually marked by the first message sender.

12. The method of claim 1, wherein comparing the suspicious text string to the stored text string manually marked by the first message sender includes identifying a distinguishing property in the suspicious text string.

13. A computing device that controls redistribution of content in a message sent by a message sender, the computing device comprising:
 a processor;
 a network interface communicatively coupled to a communications network; and
 memory storing a database and executable instructions, whereby execution of the instructions by the processor:
  receives over the network interface from a mail client a first message created by a first message sender, the first message including:
   a text string manually marked by the first message sender as confidential content upon which a distribution limit should be placed, and
   the distribution limit manually set by the first message sender identifying one or more users authorized to recirculate the confidential content,
  receives over the network from a mail client a second message subsequent to the first message, wherein the second message is distinct from the first message and created by a second message sender who is distinct from the first message sender, and the second message includes an identification of the second message sender,
  adds the text string manually marked by the first message sender and the distribution limit manually set by the first message sender to a database stored in memory,
  examines the second message for the stored text string manually marked by the first message sender, wherein examining the second message includes extracting a suspicious text string from the second message and comparing the suspicious text string to the stored text string manually marked by the first message sender,
  examines the second message for the one or more users identified in the stored distribution limit manually set by the first message sender as authorized to recirculate the confidential content, wherein the examination occurs when the suspicious text string matches the stored text string manually marked by the first message sender, and wherein examining the second message includes extracting the identification of the second message sender and comparing the identification of the second message sender to the one or more users identified in the stored distribution limit manually set by the first message sender as authorized to recirculate the confidential content, and
  transmits the second message over the network when the identification of the second message sender matches one of the one or more users identified in the stored distribution limit manually set by the first message sender as users authorized to recirculate the confidential content.

14. The computing device of claim 13, wherein the suspicious text string is a mutated form of the stored text string manually marked by the first message sender.

15. The computing device of claim 13, wherein comparing the suspicious text string to the stored text string manually marked by the first message sender includes determining an edit distance between a substring of the suspicious text string and the stored text string manually marked by the first message sender.

16. The computing device of claim 13, wherein comparing the suspicious text string to the stored text string manually marked by the first message sender includes comparing the suspicious text string to a substring that is semantically similar to the stored text string manually marked by the first message sender.

17. A non-transitory computer-readable storage medium having embodied thereon a program, the program being executable by a computer processor to perform a method for controlling redistribution of content in a message sent by a message sender, the method comprising:
 receiving over a network from a mail client a first message created by a first message sender, the first message including:
  a text string manually marked by the first message sender as confidential content upon which a distribution limit should be placed, and
  the distribution limit manually set by the first message sender identifying one or more users authorized to recirculate the confidential content;
 receiving over the network from a mail client a second message subsequent to the first message, wherein the second message is distinct from the first message and created by a second message sender who is distinct from the first message sender, and the second message includes an identification of the second message sender;
 adding the text string manually marked by the first message sender and the distribution limit manually set by the first message sender to a database stored in memory;
 examining the second message for the stored text string manually marked by the first message sender, wherein examining the second message includes extracting a suspicious text string from the second message and comparing the suspicious text string to the stored text string manually marked by the first message sender;
 examining the second message for the one or more users identified in the stored distribution limit manually set by the first message sender as authorized to recirculate the confidential content, wherein the examination occurs when the suspicious text string matches the stored text string manually marked by the first message sender, and wherein examining the second message includes extracting the identification of the second message sender and comparing the identification of the second message sender to the one or more users identified in the stored distribution limit manually set by the first message sender as authorized to recirculate the confidential content; and transmitting the second message over the network when the identification of the second message sender matches one of the one or more users identified in the stored distribution limit manually set by the first message sender as users authorized to recirculate the confidential content.

18. The non-transitory computer-readable storage medium of claim 17, wherein comparing the suspicious text string to the stored text string manually marked by the first message sender includes determining an edit distance between a substring of the suspicious text string and the stored text string manually marked by the first message sender.

19. The non-transitory computer-readable storage medium of claim 17, wherein comparing the suspicious text string to the stored text string manually marked by the first message sender includes comparing the suspicious text string to a substring that is semantically similar to the stored text string manually marked by the first message sender.

20. The non-transitory computer-readable storage medium of claim 17, wherein the method further includes quarantining the second message when the identification of the second message sender does not match the one or more users identified in the stored distribution limit manually set by the first message sender as authorized to recirculate the confidential content.

\* \* \* \* \*